Dec. 31, 1963 K. WILFERT ETAL 3,116,071
AXLE SUSPENSION FOR VEHICLES, ESPECIALLY
MOTOR VEHICLES
Filed Oct. 15, 1959 3 Sheets-Sheet 1

INVENTORS.
KARL WILFERT
ERNST J. H. FIALA

BY *Dicke, Craig & Freudenberg*

ATTORNEYS

Dec. 31, 1963    K. WILFERT ETAL    3,116,071
AXLE SUSPENSION FOR VEHICLES, ESPECIALLY
MOTOR VEHICLES
Filed Oct. 15, 1959    3 Sheets-Sheet 2
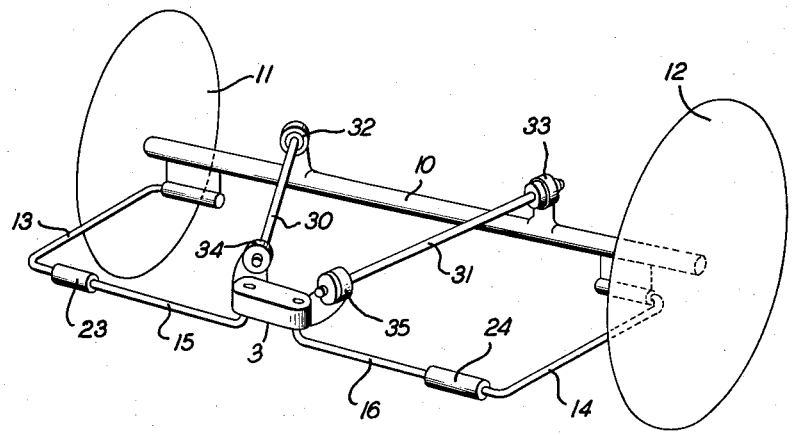
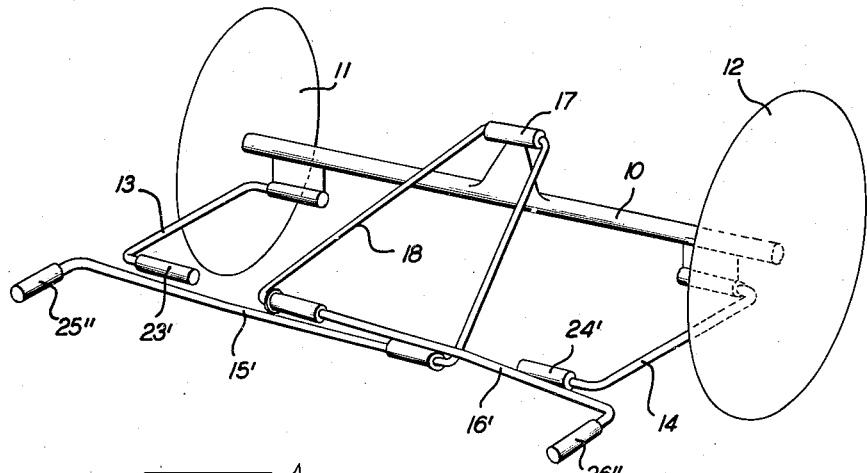
INVENTORS.
KARL WILFERT
ERNST J. H. FIALA
BY *Dicke, Craig & Freudenberg*
ATTORNEYS.

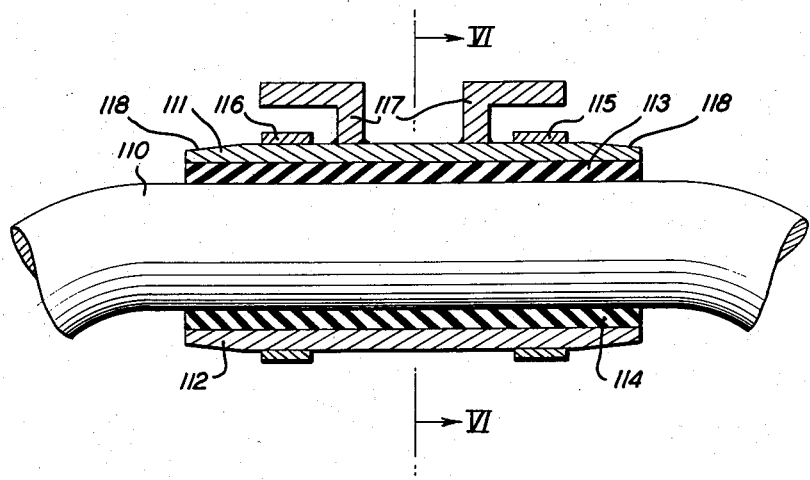
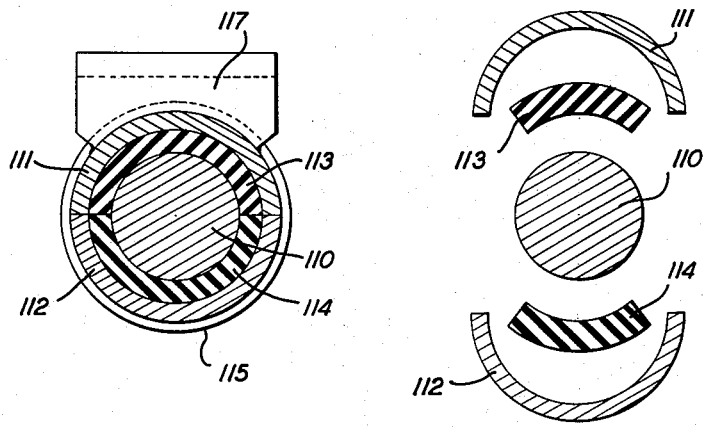

United States Patent Office 3,116,071
Patented Dec. 31, 1963

3,116,071
AXLE SUSPENSION FOR VEHICLES, ESPECIALLY MOTOR VEHICLES
Karl Wilfert, Stuttgart-Degerloch, and Ernst J. H. Fiala, Sindelfingen, Kreis Boblingen, Germany, assignors to Daimler-Benz Aktiengesellschaft, Stuttgart-Untertürkheim, Germany
Filed Oct. 15, 1959, Ser. No. 846,698
Claims priority, application Germany Oct. 18, 1958
13 Claims. (Cl. 280—124)

The present invention relates to an axle suspension for vehicles, and more particularly to a rigid axle spring suspension for motor vehicles.

As a rule, with rigid axles the one-sided spring characteristics caused by unilateral spring movements, i.e. spring movements of the wheel or wheels disposed on only one side of the central longitudinal plane of the vehicle, are softer than the two-sided spring characteristics caused by spring movements of both wheels, i.e. spring movements of the oppositely disposed wheels, for instance, in the same direction. In order to equalize this difference in the spring characteristics, oftentimes torsion rod stabilizers are used.

The present invention proposes an entirely different approach and novel solution. It is proposed in accordance with the present invention that at least one torsion rod-shaped spring extending in the longitudinal direction of the vehicle be provided, the ends of which are secured in a non-rotatable manner with respect to a geometric axis extending in the longitudinal direction of the vehicle, on the one hand, at the vehicle superstructure, frame or body of a self-supporting type construction and, on the other, at the rigid axle. With such an arrangement in case of unilateral or one-sided spring movements in which the rigid axle assumes an inclined position, as contrasted to the two-sided or unidirectional spring movements thereof, an additional spring resistance is added as a result of the torsional loads or stresses set up in the torsion rod-shaped spring extending in the vehicle longitudinal direction in addition to the existing and required springy resistance during each upward spring movement of the wheel.

The construction and arrangement in accordance with the present invention may be so selected and the spring characteristics of the different springs may be so matched to each other that during upward spring movement of one wheel, the existing spring resistance and the additional spring resistance added through the additional torsional load together are about as large as the spring resistance encountered during the simultaneous upward spring movement of both wheels, so that the spring characteristics during one-sided and two-sided spring movements become approximately equally soft. A further advantage of the arrangement according to the present invention resides in the fact that the torsion rod-shaped spring extending in the longitudinal direction of the vehicle may also serve as axle guide means to stabilize the same.

According to a further feature of the present invention, it is proposed that the torsion rod-shaped spring extending in the longitudinal direction of the vehicle is rotatably or pivotally secured, at least at one end thereof, about a geometric axis extending in the vehicle transverse direction at the vehicle superstructure, such as the frame or body, or at the rigid axle whereby the rotation or pivotal movement of the rod-shaped spring may be opposed thereat by an elastic or springy resistance. In that manner, the rod-shaped spring extending in the vehicle longitudinal direction not only serves for purposes of producing the additional torsional resistance during one-sided spring movements but also for purposes of transmitting the springy resistance during each upwardly directed spring movement of the wheel. The construction according to the present invention in particular may be so chosen in an especially simple manner that the rod-shaped spring extending in the vehicle longitudinal direction is operatively connected, preferably formed integrally with a rod-shaped spring extending in the vehicle transverse direction which in turn is non-rotatably secured with respect to a geometric axis extending in the vehicle transverse direction at the vehicle superstructure, such as the frame or body, or at the rigid axle.

Particularly for arrangements in which the rod-shaped spring extending in the vehicle longitudinal direction is rotatably or pivotally supported at the rigid axle about a geometric axis extending in the vehicle transverse direction, it is desirable, for purposes of effectively bracing and reliably absorbing the braking and driving moments acting on the rigid axle, to arrange the geometric axis of the rod-shaped spring extending in the vehicle longitudinal direction in such a manner as to cross with the geometric axis of the rigid axle at a predetermined distance.

In most cases, one rod-shaped spring extending in the vehicle longitudinal direction is arranged in proximity to the respective wheel. However, for purposes of further guiding and stabilizing the rigid axle, appropriate guide means, for example, longitudinal guide members, transverse guide members or a combination of longitudinal and transverse guide members, are arranged at the rigid axle, especially in the center portion of the rigid axle. The arrangement in accordance with the present invention may thereby be so made that the longitudinal guide member is operatively connected, preferably formed integrally with the rod-shaped spring extending in the vehicle transverse direction which is non-rotatably secured at the vehicle superstructure, such as frame or body, or at the rigid axle about a geometric axis extending in the vehicle transverse direction, whereby the rod-shaped springs extending in the vehicle longitudinal direction preferably do not oppose any resistance to pivotal movements about a geometric axis extending in the vehicle transverse direction.

The use of elastic, especially rotatable elastic bearing supports for torsion rods, finds many applications. This is also true in particular of such elastic bearing supports for torsion rod springs of wheel suspensions in motor vehicles, especially those elastic bearing supports that enable rotational movement of the torsion rod, torsion rod spring or the like with respect to a relatively stationary or fixed part of the vehicle, such as the frame or the body or with respect to an axle member or other part of the wheel suspension. The desirability as well as need for such elastic bearing supports in connection with a wheel suspension according to the present invention will become more obvious from the following specification.

However, with such type of rotatable elastic securing means, certain difficulties arise normally if the rod or the like which is to be elastically supported thereby at this place is accessible for the bearing parts annularly surrounding the same only over angularly bent portions of the rod, as is the case with a wheel suspension according to the present invention in which the rod-shaped springs are angularly bent several times.

For that purpose, it is also proposed in accordance with the present invention to provide a securing means for such an elastic bearing support essentially consisting of two semi-cylindrically shaped supporting disks of two elastic disk-shaped bearing members adapted to be interposed between the rod and the supporting disks and made of elastic material, for example, of rubber and at least one securing ring placed over the entire bearing assembly. In order that the elastic material rests firmly with certainty on the rod, it is also desirable in accordance with the present invention to provide the disk-shaped bearing members made of elastic material in the non-assembled condition thereof with an excessive radial dimension. The securing ring in accordance with the present invention may be simply placed over the assembly; however, it is also possible to secure the same by shrink-fit. In the latter case, however, it is necessary that the relationship of the masses of the supporting disks to the securing ring be so selected that the supporting disks are not exposed to heating thereof harmful to the disk-shaped bearing members made of elastic material.

Accordingly, it is an object of the present invention to provide a wheel suspension for rigid axle members which obviates the disadvantages of the prior art.

Another object of the present invention resides in the provision of a wheel suspension for rigid axle members in which the spring characteristics are approximately the same irrespective of whether the spring movements are caused by the spring movements of only one wheel or the spring movements of both oppositely disposed wheels supporting thereon the rigid axle member.

Still another object of the present invention resides in the provision of a wheel suspension for rigid axle members in which the torsion rod spring elements additionally serve the purpose of guiding the rigid axle member.

A still further object of the present invention resides in the provision of a wheel suspension for a rigid axle which is simple in construction, effective in operation for purposes of spring suspending the wheels and guiding the axle member, and relatively inexpensive as to manufacture and installation thereof.

Another object of the present invention resides in the provision of an elastic bearing assembly adapted to be readily installed in connection with angularly bent torsion rods.

A still further object of the present invention resides in the provision of a wheel suspension for a rigid axle which may be readily installed, especially as to the rotatable elastic bearings thereof.

These and other objects, features and advantages of the present invention will become more obvious from the following description when taken in connection with the accompanying drawing which shows, for purposes of illustration only, several embodiments in accordance with the present invention and wherein:

FIGURE 3 is a schematic perspective view of still another embodiment of a wheel suspension for a rigid axle member in accordance with the present invention, distinguishing itself by the relatively shorter length of the rod-shaped springs extending in the vehicle transverse direction and by the different construction of the guide means for the axle.

FIGURE 4 is a schematic perspective view of still a further modified embodiment of a wheel suspension for a rigid axle member in which the guide means are combined with the rod-shaped springs extending in the vehicle transverse direction.

FIGURE 5 is a longitudinal cross-sectional view through an elastic rotatable bearing construction in accordance with the present invention for use with the rod-springs of FIGURES 1 through 4.

FIGURE 6 is a cross-sectional view taken along line VI—VI of FIGURE 5, and

FIGURE 7 is a cross-sectional view of the bearing support of FIGURES 5 and 6 in the non-assembled condition thereof.

Figure 1:
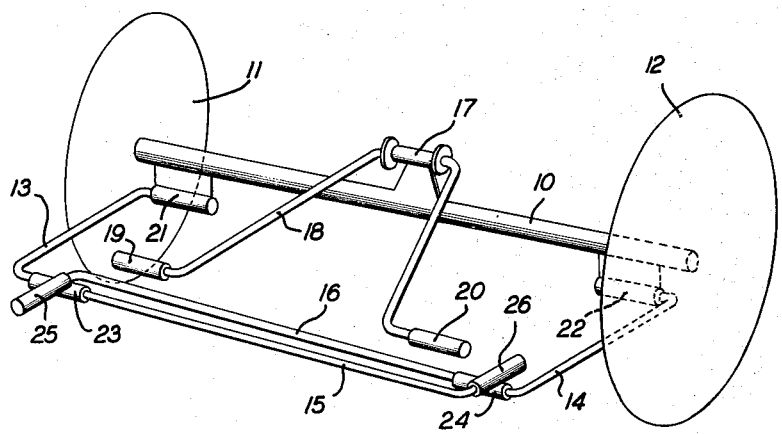
FIGURE 1 is a perspective schematic view of a wheel suspension for a rigid axle member provided with combined spring elements for the one-sided and two-sided spring movements of the wheels and with a longitudinal guide means according to the present invention.

Referring now to the drawing, wherein like reference numerals are used in the corresponding views thereof to designate like parts, and more particularly to FIGURES 1, 2, 3 and 4, reference numeral 10 designates in each case the rigid axle whereas the oppositely disposed wheels are designated by reference numerals 11 and 12, and the rod-shaped springs extending in the vehicle longitudinal direction by reference numerals 13 and 14. The rod-shaped springs extending in the vehicle transverse direction are designated in each of FIGURES 1 through 4 by reference numerals 15 and 16. The places of the bearing supports for the rod-shaped springs and for the guide members which support the rod-shaped springs either at the rigid axle members or at the vehicle superstructure, such as the frame, subframe, or the body of a self-supporting vehicle body or the like, for example, the floor assembly of a self-supporting vehicle body construction, are represented schematically in the drawing by enlarged cylindrical roller-like elements surrounding the torsion rods whereby those bearing supports for the rod-shaped spring which are not connected with the rigid axle 10 and which are shown on the drawing by themselves without any apparent connection to any other part, have to be thought of as being supported or mounted at the vehicle superstructure such as the frame, subframe, body or the like. These bearing supports are constructed elastically wherever desirable or necessary for kinematic reasons, so that, in addition to rotating or swinging movement, they also permit a tilting or canting of the rods in these elastic bearing supports within certain limits.

In the embodiment according to FIGURE 1, a bearing support 17 is elastically connected with the rigid axle 10 in which a longitudinal guide member 18 may pivot or rotate, which in turn is rigidly secured at the vehicle superstructure (not shown) such as the frame, body or the like, within bearing supports 19 and 20. The spring rods or torsion rods 13 and 15, as well as the torsion rods 14 and 16, pass over into each other, for example, by being formed integrally with each other and angularly bent in a suitable manner into the desired shape, and are rotatably supported at the rigid axle 10 in elastic bearing supports 21 and 22; additionally, the torsion rods 13, 15 and 14, 16 are also rotatably supported at the vehicle superstructure such as the frame, body or the like, in elastic bearing supports 23 and 24 and are rigidly, i.e., non-rotatably, secured along the ends thereof at the vehicle superstructure, such as the frame, body or the like, in bearing supports 25 and 26.

*Operation*

The operation of the wheel suspension illustrated in FIGURE 1 is as follows:

With a unidirectional spring movement of both wheels in the same direction, only the torsion rods 15 and 16 are stressed in torsion. However, possibly a certain bending of the rods 13 and 14 may additionally take place.

During unilateral or one-sided spring movements of only one wheel, for example, of only the right wheel 12, only the spring element 14–16 is torsionally stressed in the manner described hereinabove. Consequently, the spring characteristics would be considerably softer in that case than with unidirectional or two-sided spring movements of both wheels 11 and 12 because the distance between the rods 13 and 14 is always smaller than the wheel tread. However, as a result of the ensuing inclination of the rigid axle 10 and therewith also of the bearings 21 and 22 relative to the direction of the rods 15 and 16 and of the bearings 23 and 24, a springy torsional twisting of the longitudinally extending rods 13 and 14 also takes place so that altogether the spring resistance against the upward spring movement of the wheel 12 is approximately equally large to the unidirectional two-sided spring movements of both wheels 11 and 12. Depending on the softness of the elastic suspension of the bearings 23 and 24, a bending of rods 15 and 16 may also additionally take place for purposes of aiding the additional springy resistance offered by the wheel suspension in accordance with the present invention during the unilateral, one-sided spring movements of the wheel 12. By reason of the pivotal connection of the guide member 18 above the rigid axle 10 and of the rods 13 and 14 below the rigid axle 10, the braking and driving or accelerating moments are effectively absorbed by the wheel suspension in accordance with the present invention. The lateral guidance of the rigid axle 10 is assured by a corresponding appropriate construction of the bearing supports 17, 19 and 20.

Figure 2:
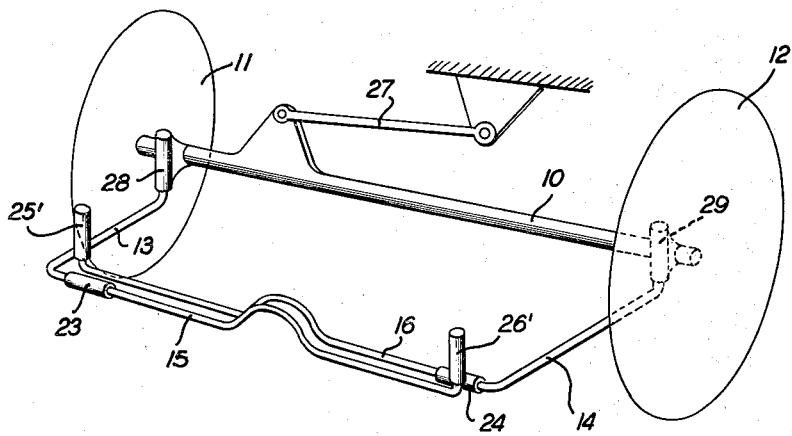
FIGURE 2 is a perspective schematic view of a modified embodiment similar to FIGURE 1 of a wheel suspension for a rigid axle in accordance with the present invention.

In the rigid-axle wheel suspension according to FIGURE 2, the lateral guidance is taken over by a transverse guide member 27 pivotally secured by appropriate bearing supports at the vehicle superstructure and rigid axle 10 whereas the support and absorption of the braking and driving or accelerating moments takes place by means of rods 13 and 14 which are secured at the rigid axle 10 in vertical elastic bearing supports 28 and 29. Vertical elastic bearing supports 25' and 26' connect rods 16 and 15, respectively, to the vehicle superstructure. Otherwise, the arrangement of FIGURE 2 operates in the same manner as that of FIGURE 1.

In the arrangement according to FIGURE 3, the guide member 18 of FIGURE 1 is replaced by two inclined guide rods 30 and 31 forming an acute angle with respect to the longitudinal center plane of the vehicle, which are secured within appropriate rubber bearings 32 and 33 at the rigid axle 10 and within appropriate rubber bearings 34 and 35 at bracket 3 which is secured to the vehicle superstructure such as the frame, body or the like. The transversely extending torsion rods 15 and 16 extend only up to approximately the vehicle center.

FIGURE 4 illustrates a rigid-axle wheel suspension arrangement in which the guide rods 18 are continued in the form of transverse rods 15' and 16' taking over the functions of rods 15 and 16 of FIGURES 1–3. The rods 13 and 14 in that embodiment, therefore, serve only for purposes of guiding and absorbing the additional torsional moments during the unilateral spring movements of only one wheel. Rods 13 and 14 are connected to the superstructure by bearings 23' and 24', respectively. On the other hand, the springy rods 15' and 16' are subjected to torsional loads or stresses with any spring movement. The ends of rods 15' and 16' are connected to the vehicle superstructure by bearings 25'' and 26'', respectively.

A particularly suitable construction of rotatable elastic bearing supports for use with torsion rods, particularly for angularly bent torsion rods as utilized in the different embodiments of FIGURES 1–4 of the present invention is illustrated in FIGURES 5 through 7 in which corresponding reference numerals of he 100 series are used.

Referring now to FIGURES 5 through 7, reference numerals 110 designates therein the rod-shaped spring or torsion rod which is to be elastically and rotatably supported in an appropriate bearing support so as to enable both rotary movement and limited edge-wise or canting movements of the torsion rod 110 with respect to its relatively fixed support which may be a part of the vehicle superstructure or the rigid axle 10. The two supporting disk members are designated in these figures by reference numerals 111 and 112 whereas the disk-shaped bearing members made of elastic material such as rubber are designated therein by reference numerals 113 and 114. The securing rings are designated in FIGURES 5–7 by reference numerals 115 and 116. The entire securing installation is supported on an angle iron 117 forming the relatively fixed support member which itself may form part or may be secured in any suitable manner to the vehicle superstructure or rigid axle member 10.

The assembly of the elastic bearing support in accordance with the present invention takes place in the following manner.

The supporting disk members 111 and 112 together with the inserted disk-shaped elastic bearing members 113 and 114 made of elastic material are clamped together in situ over the torsion rod 110 by means of a special clamping device (not shown) so that the elastic material 113, 114 is deformed in such a manner that it completely fills the space between the supporting disk members 111, 112 and the rod 110. In this clamping condition, the securing rings 115 and 116 which prior thereto could readily be moved over all the angularly bent portions of the rod 110 are emplaced without difficulty over the supporting disk members 111 and 112 which, for that purpose, are provided with tapered surfaces 118. Upon mounting the securing rings 115 and 116 over the supporting disk members 111 and 112, the clamping installation which served for compressing the supporting disk members 111 and 112 may be removed and the bearing supports are then completely assembled and ready for operation.

The term vehicle "superstructure" is used herein and in the appended claims to designate a relatively fixed part adapted to carry the weight or transmit the forces resulting therefrom to the axle members, such as the frame, subframe or body of a self-supporting vehicle body construction.

While we have shown and described several embodiments in accordance with the present invention, it is understood that the same is not limited thereto but is susceptible of many changes and modifications within the spirit and scopeof the present invention, and we, therefore, do not wish to be limited to the details shown and described herein but intend to cover all such changes and modifications as are encompassed by the scope of the appended claims.

We claim:

1. A wheel suspension for the rigid axle of a vehicle having a vehicle superstructure and oppositely disposed wheels supported by said rigid axle, comprising rod-shaped torsion spring means adjacent each said wheel for spring supporting said axle member on said superstructure including a first torsion spring portion extending in the vehicle longitudinal direction laterally thereof for guidingly connecting said rigid axle to said superstructure, the end of said first spring portion adjacent said rigid axle being bent so as to extend transversely of said vehicle, first bearing support means for securing said bent end of the first spring portion at said rigid axle so as to be rotatable about an axis extending transversely of the vehicle and non-rotatable with respect to a geometric axis extending essentially in the vehicle longitudinal direction and to provide a predetermined spring resistance to spring movements of said wheels, a second torsion spring portion integral with said first spring portion arranged at the end of said first spring portion opposite the bent end thereof extending in the vehicle transverse direction, the end of said second spring portion opposite said first spring portion being bent in the vertical direction, and second bearing support means non-rotatably securing said second spring portion about a geometric axis extending in a transverse direction of the vehicle at said vehicle superstructure to provide a predetermined spring resistance to spring movements of said wheels including bearing means adjacent said first spring portion and a bracket secured to said superstructure and said bent end of the second spring portion, and guide means extending longitudinally of the vehicle for guidingly connecting said rigid axle to said vehicle superstructure, said guide means consisting of two rod members extending at an inclination with respect to a vertical plane extending in the longitudinal direction of the vehicle, each of said rod members being resiliently connected to said rigid axle and said bracket.

2. A wheel suspension for the rigid axle of a vehicle having a vehicle superstructure and oppositely disposed wheels supported by said rigid axle, comprising rod-shaped torsion spring means adjacent each said wheel for spring supporting said axle member on said superstructure including a first torsion spring portion extending in the vehicle longitudinal direction laterally thereof for guidingly connecting said rigid axle to said superstructure, first bearing support means for securing said first spring portion at said vehicle superstructure, on the one hand, and at said rigid axle, on the other, so as to be non-rotatable with respect to a geometric axis extending essentially in the vehicle longitudinal direction and to provide a predetermined spring resistance to spring movements of said wheels, a second torsion spring portion extending in the vehicle transverse direction, and second bearing support means non-rotatably securing said second spring portion about a geometric axis extending in a transverse direction of the vehicle at one of the two parts consisting of said rigid axle and said vehicle superstructure to provide a predetermined spring resistance to spring movements of said wheels, and guide means extending longitudinally of the vehicle for guidingly connecting said rigid axle to said vehicle superstructure.

3. A wheel suspension according to claim 2, wherein said rod-shaped spring means includes for each wheel a first spring portion extending in the longitudinal direction and a second spring portion extending in the vehicle transverse direction, and wherein said first bearing support means rotatably supports said first spring portion at said rigid axle about an essentially vertical axis and non-rotatably supports said first spring portion at said rigid axle about a longitudinal axis, and wherein said second bearing support means rotatably supports one end of said second spring portion about a transverse axis and non-rotatably supports the other end thereof about said transverse axis at said vehicle superstructure, and wherein said guide means comprises a guide member extending in the transverse direction of the vehicle and means pivotally connecting said guide member to both said vehicle superstructure and said rigid axle.

4. A wheel suspension according to claim 2, wherein said rod-shaped spring means includes for each wheel a first rod-shaped spring portion extending in the vehicle longitudinal direction and a second rod-shaped spring portion extending in the vehicle transverse direction and integral with said first spring portion and wherein said first bearing support means includes first support means rotatably supporting said first spring portion at said rigid axle for rotation about a transverse axis and non-rotatably supporting said first spring portion at said rigid axle about a longitudinal axis, and wherein said second bearing support means includes second support means for supporting one end of said second spring portion for rotation about a transverse axis at said vehicle superstructure and third means non-rotatably supporting the other end thereof at said vehicle superstructure about said transverse axis, and wherein said guide means includes two guide members extending at an inclination with respect to a vertical plane extending in the vehicle longitudinal direction between said vehicle superstructure and said rigid axle, and means elastically securing each of said two guide members to both said rigid axle and said superstructure.

5. A wheel suspension according to claim 2, wherein said first bearing support means includes first means rotatably supporting said first spring portion at said rigid axle about a transverse axis and non-rotatably supports said first portion at said rigid axle about a longitudinal axis, and second means non-rotatably supporting the other end of said first spring portion at said vehicle superstructure, said guide means including an essentially U-shaped torsion rod with the web portion thereof rotatably secured to said rigid axle about a transverse axis and having transversely bent portions extending from the leg portions of the U-shaped torsion rod in the vehicle transverse direction and forming said second spring portions, and wherein said second bearing support means rotatably support one end of each of said transversely bent portions at said vehicle superstructure about said transverse axis and non-rotatably supports the other end thereon at said vehicle superstructure about said transverse axis.

6. A wheel suspension according to claim 2, wherein said guide means is secured to said rigid axle in the center portion thereof.

7. A wheel suspension according to claim 2, wherein said rod-shaped spring means includes a torsion rod angularly bent at both ends thereof, and wherein said bearing support means includes at least one elastic bearing support for said torsion rod to enable relative rotational movement and canting thereof within said bearing support means, said bearing support including two semi-cylindrically-shaped supporting disk members, two elastically deformable disk-shaped bearing members adapted to be inserted between said torsion rod and said supporting disk members, at least one securing ring slidably mounted over the entire bearing support assembly to hold the same in place, and separate means for securing said bearing support assembly to one of said superstructure and said rigid axle.

8. A wheel suspension according to claim 2, wherein said rod-shaped spring means includes a torsion rod angularly bent at both ends thereof, and wherein said bearing support means includes at least one annularly-shaped bearing support surrounding said torsion rod, said bearing support being so constructed and arranged as to allow simple application thereof to said torsion rod at any point along the length thereof and to enable relative rotational movement and canting thereof within said bearing support means.

9. A wheel suspension according to claim 2, wherein said rod-shaped spring means includes a torsion rod angularly bent at several places along the length thereof, and wherein said bearing support means includes at least one annularly-shaped elastic bearing support surrounding said torsion rod, said bearing support including two half-shells and means including at least one ring element slidable over said half-shells when assembled on said rod for securing said half-shells together to thereby allow simple application of the bearing support to said torsion rod at any point along the length thereof, said bearing support enabling relative rotational movement and canting thereof within said bearing support means, and separate means for securing said bearing support assembly to one of said superstructure and said rigid axle.

10. A wheel suspension for the rigid axle of a vehicle having a vehicle superstructure and oppositely disposed wheels supported by said rigid axle, comprising rod-shaped torsion spring means for spring supporting said axle member on said superstructure including at least one first torsion spring portion extending in the vehicle longitudinal direction for guidingly connecting said rigid axle to said superstructure, first bearing support means for securing said first spring portion at said vehicle superstructure, on the one hand, and at said rigid axle, on the other so as to be non-rotatable with respect to a geometric axis extending essentially in the vehicle longitudinal direction and to provide a predetermined spring resistance to spring movements of said wheels, at least one second torsion spring portion extending in the vehicle transverse direction, and second bearing support means non-rotatably securing said second spring portion about a geometric axis extending in a transverse direction of the vehicle at one of the two parts consisting of said rigid axle and said vehicle superstructure to provide a predetermined spring resistance to spring movements of said wheels.

11. A wheel suspension according to claim 10, wherein said rod-shaped spring means includes for each wheel a first rod-shaped spring portion extending in the longitudinal direction of the vehicle and a second spring portion extending in the vehicle transverse direction, and wherein said first bearing support means rotatably supports said first spring portion at said rigid axle about an essentially horizontal transverse axis and non-rotatably supports said first spring portion at said rigid axle about a longitudinal axis, and wherein said second bearing support means includes means rotatably supporting said second spring portion about a transverse axis at said vehicle superstructure at one end thereof and means non-rotatably supporting the other end thereof about said transverse axis to obtain a torsion rod effect.

12. A wheel suspension according to claim 10, wherein said rod-shaped spring means includes for each wheel a first spring portion extending in the longitudinal direction and a second spring portion extending in the vehicle transverse direction, and wherein said first bearing support means rotatably supports said first spring portion at said rigid axle about an essentially vertical axis and non-rotatably supports said first spring portion at said rigid axle about a longitudinal axis, and wherein said second bearing support means includes means rotatably supporting one end of said second spring portion about a transverse axis and means non-rotatably supporting the other end thereof about said transverse axis at said vehicle superstructure.

13. A wheel suspension according to claim 10, wherein said rod-shaped spring means includes for each wheel a first rod-shaped spring portion extending in the vehicle longitudinal direction and a second rod-shaped spring portion extending in the vehicle transverse direction, and wherein said first bearing support means rotatably supports said first spring portion at said rigid axle about a transverse axis and non-rotatably supports said first spring portion at said rigid axle about a longitudinal direction, and wherein said second bearing support means includes means supporting one end of said second spring portion rotatably about a transverse axis at said vehicle superstructure and means non-rotatably supporting the other end thereof at said vehicle superstructure about said transverse axis.

References Cited in the file of this patent
UNITED STATES PATENTS

| | | |
|---|---|---|
| 2,393,033 | Ellinwood | Jan. 15, 1946 |
| 2,480,934 | Julien | Sept. 6, 1949 |
| 2,556,630 | Panhard | June 12, 1951 |
| 2,621,949 | Grantham | Dec. 16, 1952 |
| 2,641,482 | Wilfert | June 9, 1953 |
| 2,741,493 | Matthias | Apr. 10, 1956 |
| 2,746,766 | Nallinger | May 22, 1956 |
| 2,772,104 | Thiry | Nov. 27, 1956 |
| 2,843,397 | Bastow | July 15, 1958 |
| 2,869,891 | Venditty | Jan. 20, 1959 |
| 2,893,723 | Bagnall | July 7, 1959 |
| 2,915,321 | Wilfert | Dec. 1, 1959 |
| 2,983,521 | Dauben | May 9, 1961 |